G. L. KENNEDY.
COMBINED STUFFING BOX, GASKET, VALVE, AND SPRING.
APPLICATION FILED SEPT. 2, 1909.
957,347.
Patented May 10, 1910.
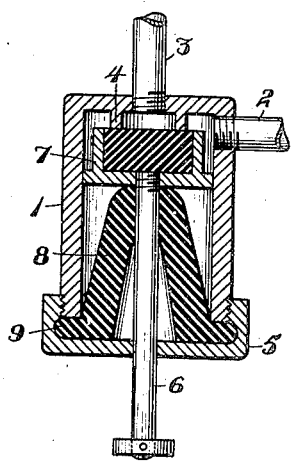
Fig.1.
Fig.2.
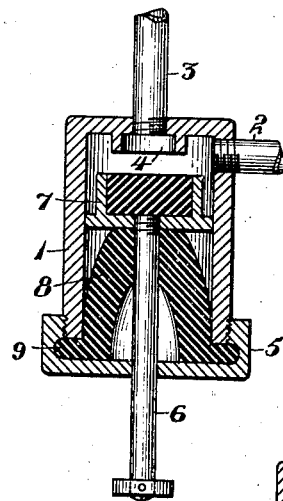
Fig.3.
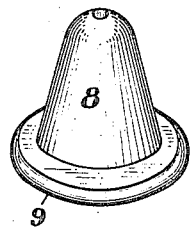
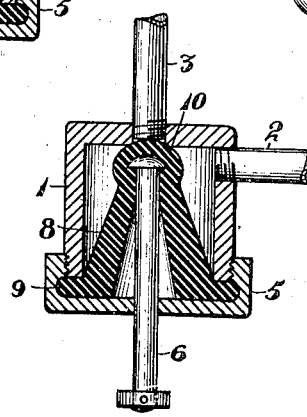
Fig.4.
WITNESSES:
F. C. Fliedner
N. B. Keating
INVENTOR
Guy L. Kennedy,
BY
F. M. Wright,
ATTORNEY

UNITED STATES PATENT OFFICE.

GUY L. KENNEDY, OF SAN FRANCISCO, CALIFORNIA, ASSIGNOR TO NATIONAL CARBONATED LIQUID CO., OF SAN FRANCISCO, CALIFORNIA, A CORPORATION OF CALIFORNIA.

COMBINED STUFFING-BOX, GASKET, VALVE, AND SPRING.

957,347.

Specification of Letters Patent. Patented May 10, 1910.

Application filed September 2, 1909. Serial No. 515,972.

*To all whom it may concern:*

Be it known that I, GUY L. KENNEDY, a citizen of the United States, residing at San Francisco, in the county of San Francisco and State of California, have invented new and useful Improvements in Combined Stuffing - Boxes, Gaskets, Valves, and Springs, of which the following is a specification.

The object of the present invention is to provide a cheap and effective device for controlling the passage of fluids, and particularly of gases under high pressure.

The device is herein shown as in use with a valve, but it may also be used with other movable elements, as a piston.

Valves for use with gases under high pressure are in general expensive on account of the skilled and careful workmanship necessary in their manufacture to prevent leakage.

The object of the present invention is to provide a valve which can be so used and can yet be made at a very low cost.

In the accompanying drawing, Figure 1 is a vertical section of the device, showing the valve closed; Fig. 2 is a similar view of the device, showing the valve open, Fig. 3 is a perspective view of a combined stuffing box, gasket, and spring detached; Fig. 4 is a view similar to Fig. 1 of a modified form of the invention.

Referring to the drawing, and particularly to the form of the invention shown in Figs. 1 and 2, 1 indicates a casing, open at one end, generally of a cylindrical form, to which are connected two pipes, 2, 3, one of said pipes, as 2, being connected to the side of the casing, and the other, as 3, to the center of its closed end. Either of these pipes may be used as the inlet pipe and the other as the outlet, and, for convenience of description, the pipe 2 will be supposed to be the outlet pipe and pipe 3 the inlet pipe. Surrounding the inner end of the inlet pipe is formed, upon the end of the casing, a circular wall or flange 4, and screwed upon the open end of the casing is a cap 5, through which passes centrally a stem 6, connected, in any suitable manner, here being shown as screwed, to a valve 7 faced with rubber and adapted to be pressed against the edge of the depending wall 4 and thereby close the passage leading from the inlet to the outlet pipe. Surrounding the stem 6 is a conoidal shell 8 formed of rubber of considerable thickness, and therefore having considerable resilient force, said shell having at its base an outwardly extending flange 9. Said flange is clamped between the cap 5 and the end of the casing and the shell is centrally apertured to permit the valve stem to pass therethrough, the rubber of the shell fitting tightly around said stem and being pressed by its resiliency against the outer surface of the valve. Said rubber shell performs several functions:—It takes the place of a spring, pressing the valve to its seat; it forms a gasket preventing the escape of any gas from the casing, because its flange is firmly clamped between the valve casing and the cap; and its central portion fits with an air-tight fit around the valve stem and prevents the escape of gas at the center, and thus acts as a movable stuffing box.

In the form of the invention shown in Fig. 4, no separate valve is used, but the valve stem is formed with a head 10 around which the apex of the conoidal shell, which is not now perforated, is molded, by which means said apex always moves with the valve stem. Said apex is of such form that, when the valve stem is not withdrawn, the apex closes the end of the pipe 3 and acts as a valve.

With either form of the device here shown, the leakage of gas is absolutely prevented, even under very high pressure, and yet the device is very cheap, both in cost of material and workmanship.

I claim:—

1. In combination with a casing provided with means for admitting and exhausting fluid therefrom, a device movable in said casing and having a stem, and a soft rubber conoidal shell having its base secured with an air-tight fit to said casing, and its central portion fitting air-tight around said stem, substantially as described.

2. In combination with a casing, a soft rubber shell having a flange secured to said casing, and a central device within the casing around which the shell fits air-tight and which is operatively connected to said shell to move therewith, substantially as described.

3. In combination with a casing formed to provide a passage for the flow of gas, a valve for closing said passage, comprising a soft rubber shell having its edge secured air-tight to said casing, a stem around which the center of the shell fits air-tight, and which is connected to said center to withdraw the same with the movement of said stem, and means moving with the shell for closing said passage, substantially as described.

4. In combination with a casing formed to provide a passage for fluid, a shell having its edge secured to said casing, a central stem around which said shell fits air-tight, said shell having a valve movable therewith and with the stem to close said passage, and the thickness of said shell being sufficient to provide force from the resilience of the rubber to hold said valve to its seat and close said passage, substantially as described.

In testimony whereof I have hereunto set my hand in the presence of two subscribing witnesses.

GUY L. KENNEDY.

Witnesses:
FRANCIS M. WRIGHT,
D. B. RICHARDS.